(12) United States Patent
Brewer et al.

(10) Patent No.: US 10,924,422 B2
(45) Date of Patent: Feb. 16, 2021

(54) IMPLEMENTING ENHANCED NETWORK DEVICE LABELING VIA ETHERNET

(71) Applicant: International Business Machines Corporation, Armonk, NY (US)

(72) Inventors: Derek Brewer, Bowling Green, OH (US); Robert Wilhelm, Cheyenne, WY (US); Paul M. Crutcher, Rochester, MN (US); Mike Maurer, Rochester, MN (US); Kerry Langford, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 27 days.

(21) Appl. No.: 16/117,884

(22) Filed: Aug. 30, 2018

(65) Prior Publication Data

US 2020/0076741 A1 Mar. 5, 2020

(51) Int. Cl.
*H04L 12/823* (2013.01)
*H04L 29/06* (2006.01)
*H04L 12/741* (2013.01)

(52) U.S. Cl.
CPC .............. *H04L 47/32* (2013.01); *H04L 45/74* (2013.01); *H04L 69/22* (2013.01)

(58) Field of Classification Search
CPC .......... H04L 47/32; H04L 45/74; H04L 69/22
USPC ....................................................... 709/201
See application file for complete search history.

(56) References Cited

U.S. PATENT DOCUMENTS

| | | | |
|---|---|---|---|
| 6,636,499 B1 * | 10/2003 | Dowling | H04L 12/4625 370/338 |
| 9,091,719 B2 | 7/2015 | Tucker | |
| 9,196,999 B2 | 11/2015 | Shifris et al. | |
| 9,323,631 B2 | 4/2016 | Brodsky et al. | |
| 9,581,636 B2 | 2/2017 | Yossef | |
| 9,678,133 B2 | 6/2017 | Enge | |
| 9,742,633 B2 | 8/2017 | Koziy et al. | |
| 9,756,404 B2 | 9/2017 | Raza et al. | |
| 2010/0128633 A1 * | 5/2010 | Krishnamurthy | H04L 45/00 370/254 |
| 2012/0147898 A1 * | 6/2012 | Koponen | H04L 49/70 370/422 |
| 2012/0236761 A1 * | 9/2012 | Yang | H04L 61/103 370/259 |
| 2013/0141113 A1 | 5/2013 | Tucker | |
| 2013/0234725 A1 | 9/2013 | Enge | |
| 2014/0258504 A1 * | 9/2014 | Kahkoska | H04L 43/50 709/224 |
| 2015/0095788 A1 * | 4/2015 | Thiele | G06F 3/0482 715/735 |

(Continued)

*Primary Examiner* — Meng Vang
(74) *Attorney, Agent, or Firm* — Daniel M. Yeates

(57) ABSTRACT

A method and system are provided for implementing enhanced network device identifying and labeling via a connected Ethernet cable. A system includes a server having a port connected by the Ethernet cable to a port of a switch. An Ethernet runt packet containing metadata identifying the server name and the port is transmitted on the Ethernet cable by the server. Another Ethernet runt packet containing metadata identifying the switch name and the port is transmitted on the Ethernet cable by the switch. Use of the transmitted metadata of the Ethernet runt packets enables dynamically identifying and labeling the Ethernet cable, the connected server and port and switch and port.

20 Claims, 6 Drawing Sheets

(56) References Cited

U.S. PATENT DOCUMENTS

2015/0178173 A1    6/2015  Brodsky et al.
2016/0007102 A1    1/2016  Raza et al.
2016/0301575 A1*  10/2016  Jau ......................... H04L 41/12
2018/0213573 A1*  7/2018  Hall ..................... H04W 24/06

* cited by examiner

IMPLEMENTING ENHANCED NETWORK DEVICE LABELING VIA ETHERNET

FIELD OF THE INVENTION

The present invention relates generally to the data processing field, and more particularly, relates to method and system for implementing enhanced network device identifying and labeling via a connected Ethernet cable.

BACKGROUND

Within a raised floor data center the tangle of wires and cables usually becomes incomprehensible as servers/systems are relocated due to regular lab activity and reorganizations. To move and add servers and systems on a raised floor is manually labor intensive and error prone for hardware outages due to incorrect cabling. For example, this becomes a problem of moving one server and system from one side of the raised floor room to another in a quick, efficient manner with the correct, confirmed cabling both before and after the move.

A need exists for an efficient and effective mechanism for dynamically detecting for each cable which port/card of each server/switch a cable is connected. From either end of the connection, some type of visual interface is needed to enable quickly labeling each cable for identification.

SUMMARY OF THE INVENTION

Principal aspects of the present invention are to provide a method and system for implementing enhanced network device identifying and labeling via a connected Ethernet cable. Other important aspects of the present invention are to provide such method and system substantially without negative effects and that overcome some disadvantages of prior art arrangements.

In brief, a method and network system are provided for implementing enhanced network device identifying and labeling via a connected Ethernet cable. A network system includes a server having a port connected by the Ethernet cable to a port of a switch. An Ethernet runt packet containing metadata identifying the server name and the port is transmitted on the Ethernet cable by the server. Another Ethernet runt packet containing metadata identifying the switch name and the port is transmitted on the Ethernet cable by the switch. Use of the transmitted metadata of the Ethernet runt packets enables dynamically identifying and labeling the Ethernet cable, the connected server and port and switch and port.

In accordance with features of the invention, an intelligent network device capability is provided to dynamically identify and label connected Ethernet cables based on interpreting the Ethernet runt packets using intelligent metadata transmitted on a specific Ethernet cable. A maximum size of a runt packet is 63 bytes with the payload for data limited. When a standard Ethernet frame format is used, the maximum payload is 45 bytes. Since the runt packet is intended to only travel one hop and be discarded, the entire 63 bytes could be used since source and destination mac address bytes and other control bytes are not needed.

In accordance with features of the invention, a small pass through device is provided that has a display screen. A function of the small pass through device is to display the runt packet metadata passing through in either direction.

In accordance with features of the invention, runt packets defined by less than 64 bytes of the Ethernet protocol are provided to periodically send identification data to essentially self-identify the cable of a server and switch that is connected.

In accordance with features of the invention, the Ethernet protocol states that Runt Packets are to be discarded and not repeated throughout the network. Discarding the runt packet happens once the runt packet gets to a next hop along its route. This ensures that any metadata broadcast within an Ethernet runt packet for a data center only exists for exactly 1 hop on the network.

In accordance with features of the invention, identification of ports can be either on the switch or router, server system, or at an intelligent patch panel. Since a patch panel is not an official hop on the network, the patch panels only read the runt packets without modifying or discarding the runt packets. The patch panels display what is connected to both the input and output of a particular port.

In accordance with features of the invention, a runt-packet detection enabled network device reads the intentional Ethernet runt packets and uses the 63 bytes or less of coded information to identify the server, port, and other information to determine where the cable is physically connected. This is an automated digital equivalent of the analog process of two people in a lab pulling on wires at the server and at the patch panel, switch or router to "feel" or "see" where a server and port is connected. The manual process is error prone due to accidentally tugging extraneous cables and losing visual tracing of the cable route under the raised floor in the tangle of wires or cables. Cables that are dynamically detected and digitally identified removes the error prone problems and greatly reduces the time and effort in physically handling any specific cable. The network device includes a small visual interface display, such as an LCD, LED, or eINK display, that a person can visually access to see the metadata for a particular port. A person has simple navigation buttons to allow toggling between all the different port numbers to display their known status and information.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

In the following detailed description of embodiments of the invention, reference is made to the accompanying drawings, which illustrate example embodiments by which the invention may be practiced. It is to be understood that other embodiments may be utilized and structural changes may be made without departing from the scope of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In accordance with features of the invention, a method and network system are provided for implementing enhanced network device identifying and labeling via a connected Ethernet cable.

Figure 1:
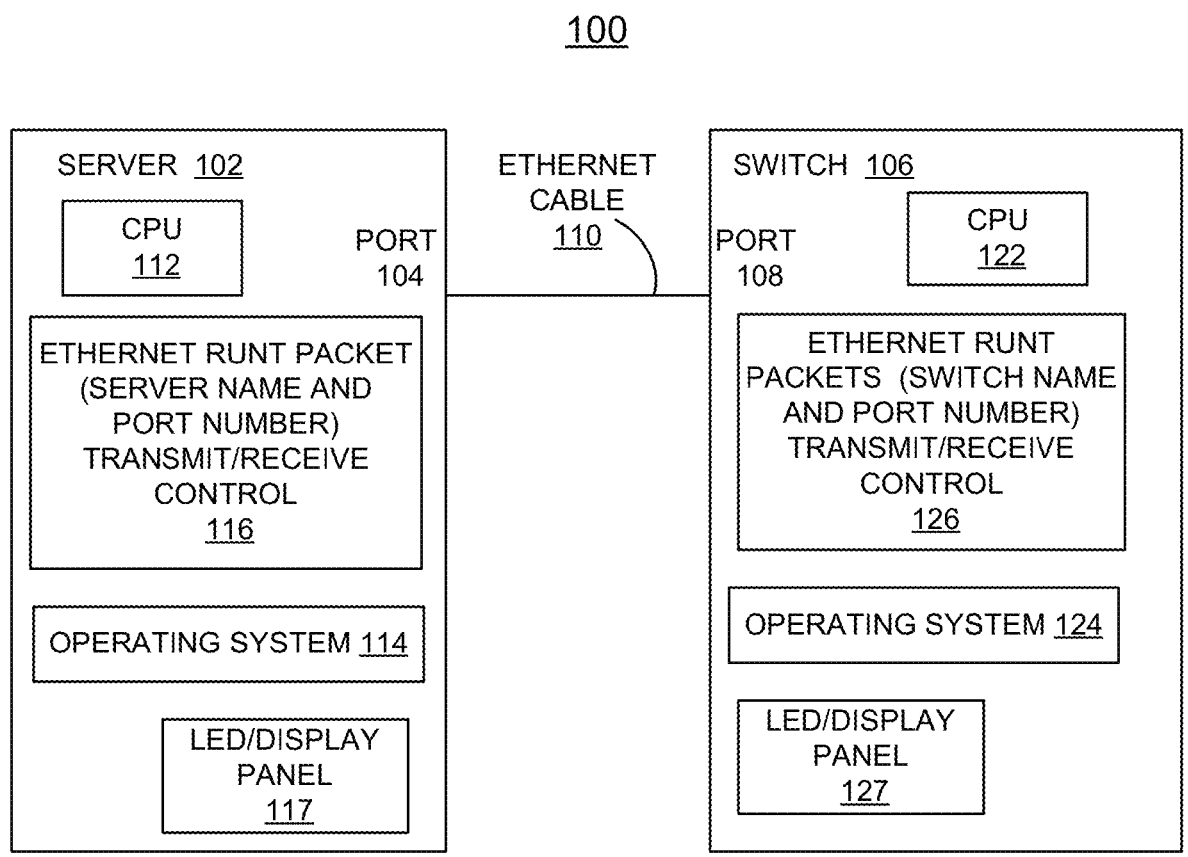
FIG. 1 is a block diagram of an example network system for implementing enhanced network identifying and labeling via a connected Ethernet cable in accordance with the preferred embodiments.

Having reference now to the drawings, in FIG. 1, there is shown a network system embodying the present invention generally designated by the reference character 100 for implementing enhanced network identifying and labeling via a connected Ethernet cable in accordance with a preferred embodiment. Network system 100 includes a server 102 having a port 104, a switch 106 having a port 108, each connected to an Ethernet cable 110.

As shown, the server 102 includes one or more processors 102 or general-purpose programmable central processing units (CPUs) 112, one shown. As shown, server 102 includes an operating system 114, an Ethernet runt packet transmit/receive control 116 to transmit a server name and port number, in accordance with a preferred embodiment and a display panel, such as an LED display 117.

As shown, the switch 106 includes one or more processors 122 or general-purpose programmable central processing units (CPUs) 112, one shown. As shown, switch 106 includes an operating system 124, an Ethernet runt packet transmit/receive control 126 to transmit a switch name and port number, in accordance with a preferred embodiment and a display panel, such as an LED display 127.

Network system 100 is shown in simplified form sufficient for understanding the present invention. It should be understood that the present invention is not limited to the illustrated arrangement of network system 100.

An Ethernet runt packet is containing metadata identifying the server name and the port is transmitted on the cable 110 by the server 102. Another Ethernet runt packet is containing metadata identifying the switch name and the port is transmitted on the cable by the switch 106. Use of the transmitted metadata of the Ethernet runt packets enables dynamically identifying and labeling the cable, the connected server and port and switch and port by the respective Ethernet runt packet transmit/receive control 116, 126 of the server 102, and switch 106. As shown, the network server 102 and switch 106 includes a visual interface display, such as an LCD, LED, or eINK display 117, 127. Once the packet goes from the server 102 to switch 106, or vice versa, the packet is analyzed for metadata and immediately discarded instead of being sent to the next networking device.

Server 102 and switch 106 include an intelligent network device capability provided by the respective Ethernet runt packet transmit/receive control 116, 126 to dynamically identify and label connected cables based on interpreting Ethernet runt packets using intelligent metadata transmitted on a specific cable.

Server 102 and switch 106 transmit a respective runt packet having a maximum size of 63 bytes with the payload for data limited. When a standard Ethernet frame format is used, the maximum payload is 45 bytes. Since the runt packet is intended to only travel one hop and be discarded, the entire 63 bytes could be used since source and destination mac address bytes and other control bytes are not needed.

In accordance with features of the invention, the runt packets defined by less than 64 bytes of the Ethernet protocol, periodically send identification data to essentially self-identify the cable 110 of a server 102 and switch 106 that is connected. The Ethernet protocol states that Runt Packets are to be discarded and not repeated throughout the network. Discarding the runt packet at the server 102 and switch 106 happens once the runt packet gets to a next hop along its route. This ensures that any metadata broadcast within an Ethernet runt packet for a data center only exists for exactly 1 hop on the network.

Each of the runt-packet detection enabled network server 102 and switch 106 reads the intentionally transmitted Ethernet runt packets and uses the 63 bytes or less bytes of coded information to identify the server 102, port 104, switch 106, port 108 and other information to determine where the cable 110 is physically connected. This is an automated digital equivalent of the analog process of two people in a lab pulling on wires at the server and at the patch panel do determine where the cable 110 is physically connected. The manual process is error prone and dynamically detecting and digitally identifying the connected cable 110 removes the error prone problems and greatly reduces the time and effort in physically handling any specific cable.

Figure 2:
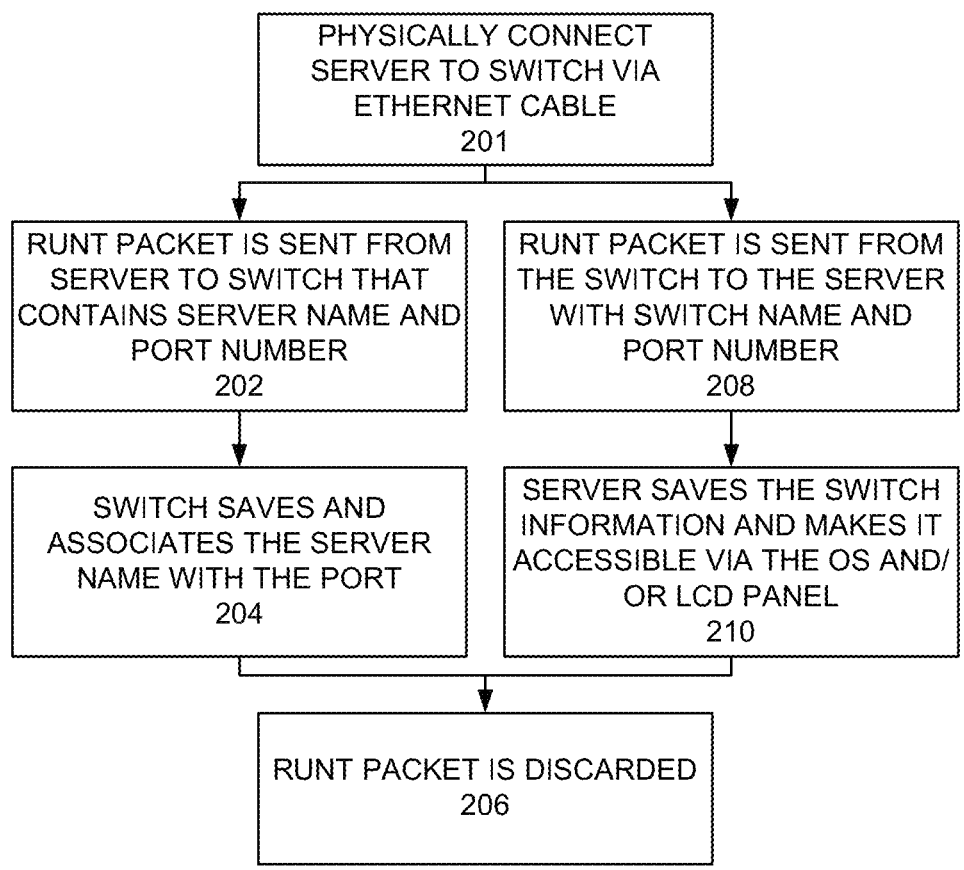
FIG. 2 is a flow chart illustrating example steps for implementing enhanced network identifying and labeling via a connected Ethernet cable in accordance with the preferred embodiment.

Referring now to FIG. 2, there are shown example steps generally designated by the reference character 200 for implementing network device identifying and labeling via a connected Ethernet cable in accordance with a preferred embodiment. As indicated at a block 201, a server is physically connected to a switch via an Ethernet cable. As indicated in a block 202, on a server, a runt packet is sent form the server to the switch that contains the server name and port number connected to the Ethernet cable. As indicated in a block 204, the switch saves and associates the server name with the port. Then as indicated in a block 206, the runt packet is discarded.

As indicated in a block 208, on a switch, a runt packet is sent from the switch to the server that contains the switch name and port number connected to the Ethernet cable. As indicated in a block 210, the server saves and associates the switch name with the port information and makes the switch information accessible via the operating system and/or LCD panel, or other server display. Then as indicated in the block 406, the runt packet is discarded.

Figure 3:
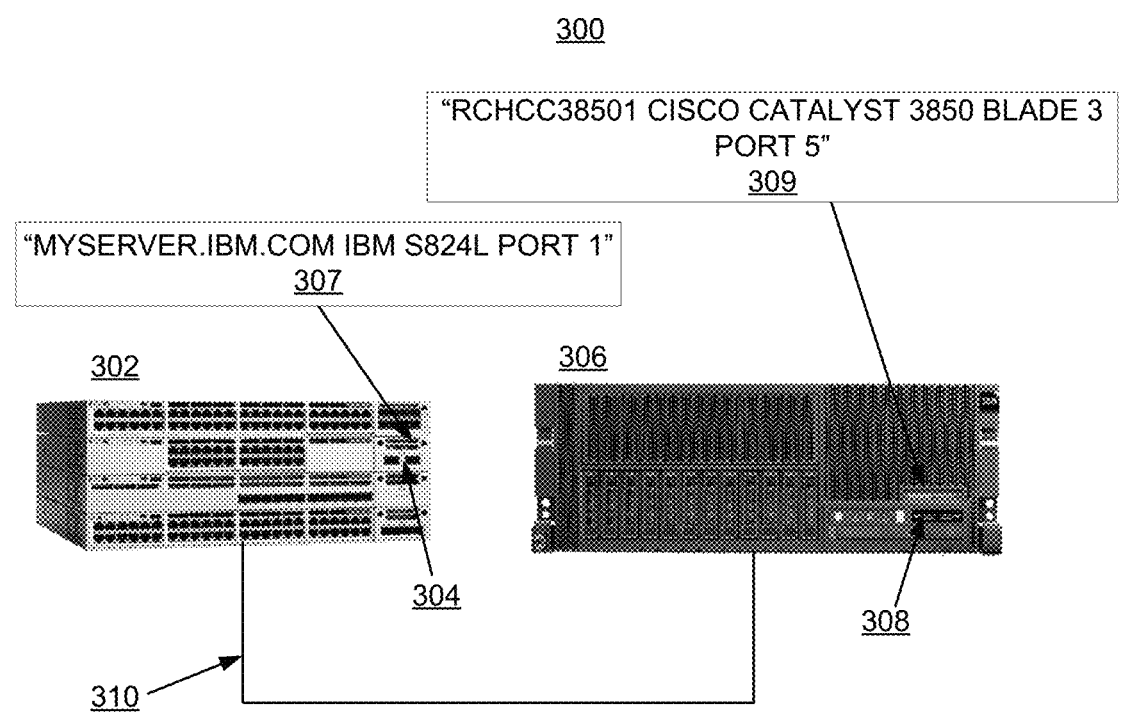
FIGS. 3, 4, and 5 illustrate respective examples for implementing enhanced network identifying and labeling via a connected Ethernet cable in accordance with the preferred embodiments.
Figure 4:
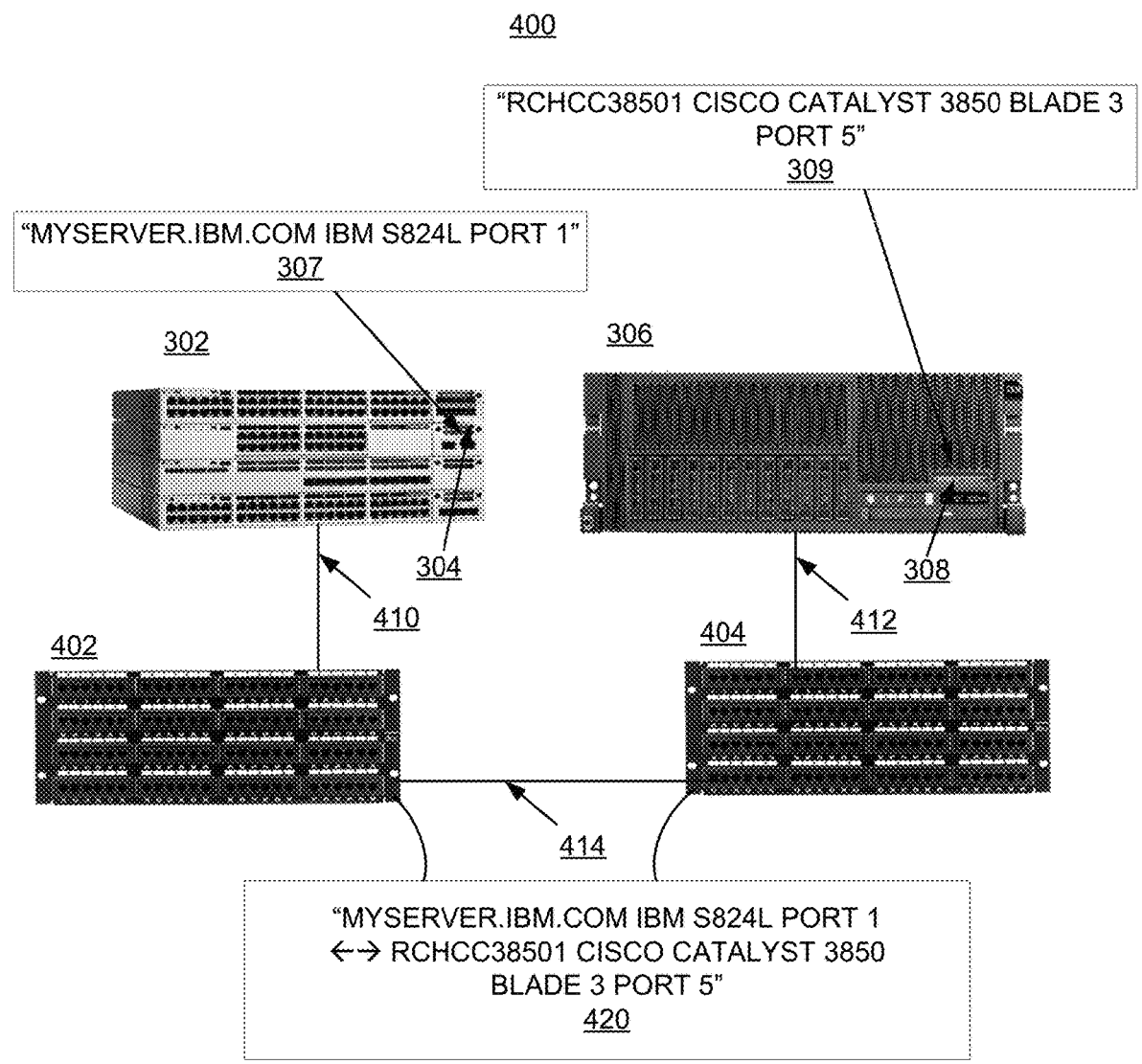
Figure 5:
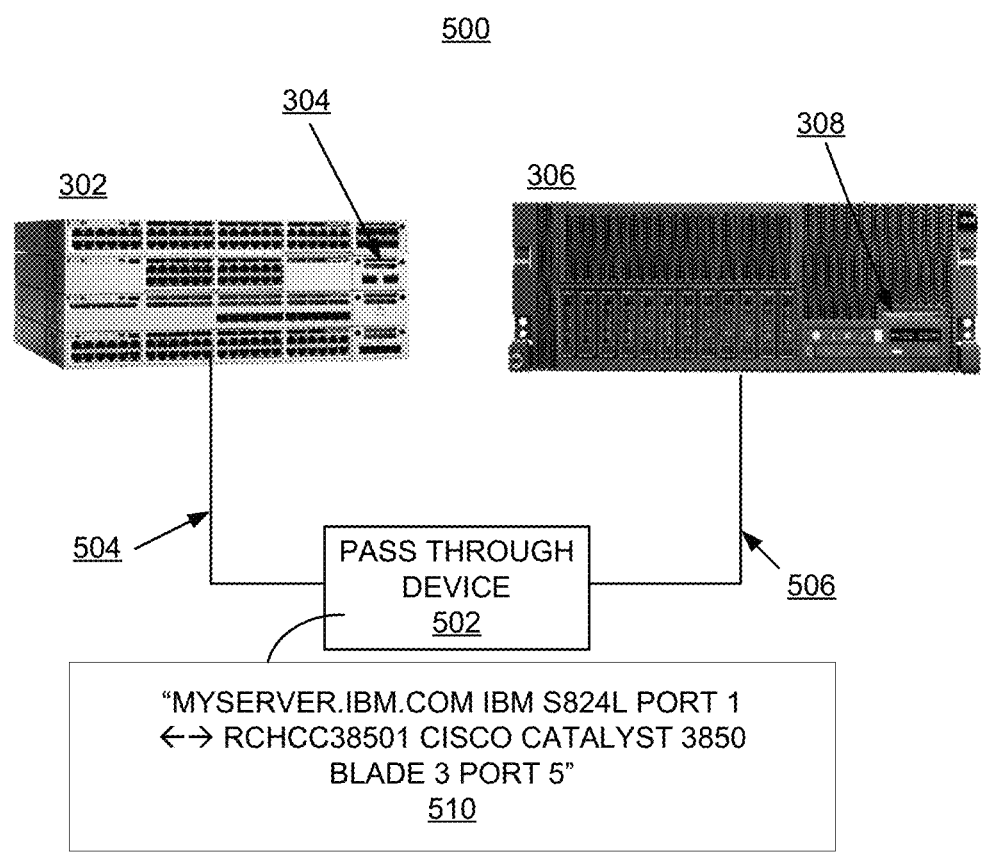

Referring to FIGS. 3, 4, and 5, there are shown respective examples for implementing enhanced network device identifying and labeling via a connected Ethernet cable in accordance with the preferred embodiments.

In FIG. 3, there is shown a network system generally designated by the reference character 300 including a switch 302 having a port 304 connected to a server 306 at a port 308 by an Ethernet cable 310. As shown, a switch display 307 displays the metadata "MYSERVER.IBM.COM IBM S824L PORT 1" and a server display 309 displays "RCHCC38501 CISCO CATALYST 3850 BLADE 3 PORT 5" in accordance with a preferred embodiment, as shown in FIG. 3. Using Ethernet runt packets periodic identifying metadata packets are transmitted from each node 302, 306.

In FIG. 4, there is shown a network system generally designated by the reference character 400 including a switch 302 having a port 304 connected to a server 306 at a port 308 by a pair of patch panels 402, 404 with Ethernet cables 410, 412 respectively connected to the switch 302 at port 304 by an Ethernet cable 414, connected together by an Ethernet cable 414, and connected to the server 306 at a port 308. As shown, a switch display 307 displays the metadata "MYSERVER.IBM.COM IBM S824L PORT 1" and a server display 309 displays "RCHCC38501 CISCO CATALYST 3850 BLADE 3 PORT 5" in accordance with a preferred embodiment, as shown in FIG. 4. Using Ethernet runt packets periodic identifying metadata packets are transmitted from each node 302, 306. A pair of patch panel displays 420 displays "MYSERVER.IBM.COM IBM S824L PORT 1←→RCHCC38501 CISCO CATALYST 3850 BLADE 3 PORT 5." The pair of patch panels 402, 404, each implemented with an intelligent patch panel providing identification of ports. The patch panel is not considered as an official hop on the network, the patch panels 402, 404 only have the ability to read the runt packets without modifying or discarding anything. In this case, the patch panels displaying endpoint data on both of the patch panels 402, 404 including what is connected to both the input and output of a particular port, as illustrated by displays 420.

In FIG. 5, there is shown a network system generally designated by the reference character 500 including a switch 302 having a port 304 connected to a server 306 at a port 308 connected by a small pass through device 502 with Ethernet cables 504, 506, together forming an Ethernet cable between the switch 302 and server 306. The pass through device 502 includes a small screen 510. The pass through device 502 is connected at an arbitrary point between the switch 302 and server 306 to gather and display metadata. A function of the pass through device 502 is to display the runt packet metadata passing through in either direction. As shown in FIG. 5, display 510 "MYSERVER.IBM.COM IBM S824L PORT 1←→RCHCC38501 CISCO CATALYST 3850 BLADE 3 PORT 5."

Figure 6:
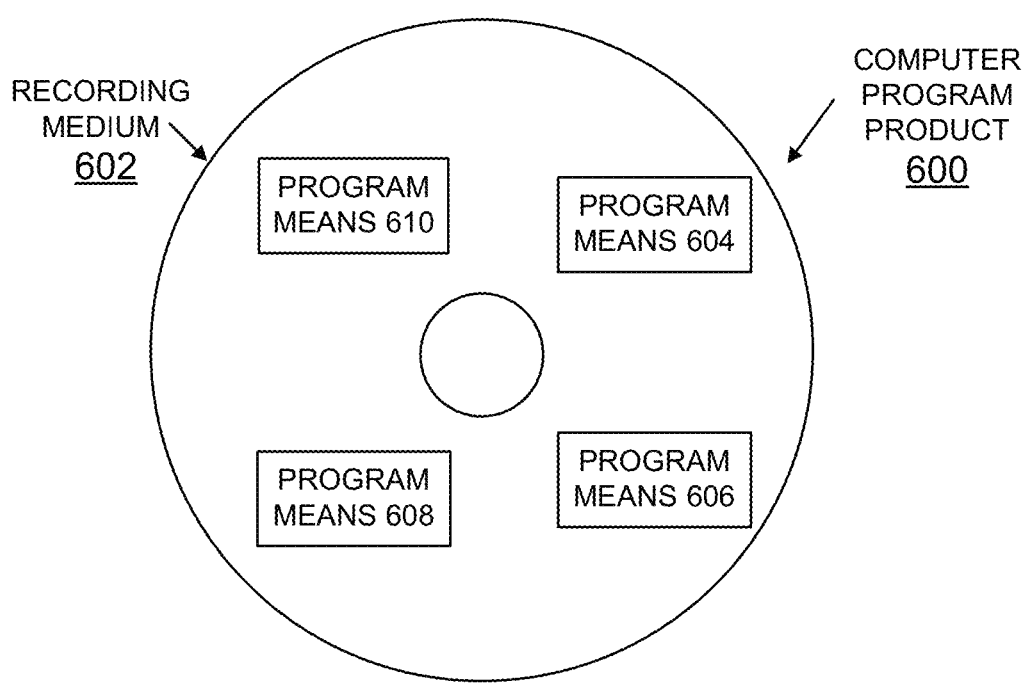
FIG. 6 is a block diagram illustrating a computer program product in accordance with the preferred embodiments.

Referring now to FIG. 6, an article of manufacture or a computer program product 600 of the invention is illustrated. The computer program product 600 is tangibly embodied on a non-transitory computer readable storage medium that includes a recording medium 602, such as, a floppy disk, a high capacity read only memory in the form of an optically read compact disk or CD-ROM, a tape, or another similar computer program product. The computer readable storage medium 602, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Recording medium 602 stores program means or instructions 604, 606, 608, and 610 on the non-transitory computer readable storage medium 602 for carrying out the methods for implementing network device identifying and labeling via a connected Ethernet cable of the preferred embodiments in the system 100 of FIG. 1.

Computer readable program instructions 604, 606, 608, and 610 described herein can be downloaded to respective computing/processing devices from a computer readable storage medium or to an external computer or external storage device via a network, for example, the Internet, a local area network, a wide area network and/or a wireless network. The computer program product 600 may include cloud based software residing as a cloud application, commonly referred to by the acronym (SaaS) Software as a Service. The network may comprise copper transmission cables, optical transmission fibers, wireless transmission, routers, firewalls, switches, gateway computers and/or edge servers. A network adapter card or network interface in each computing/processing device receives computer readable program instructions 604, 606, 608, and 610 from the network and forwards the computer readable program instructions for storage in a computer readable storage medium within the respective computing/processing device.

A sequence of program instructions or a logical assembly of one or more interrelated modules defined by the recorded program means 604, 606, 608, and 610, direct the system 100 for implementing network device identifying and labeling via a connected Ethernet cable of the preferred embodiments.

While the present invention has been described with reference to the details of the embodiments of the invention shown in the drawing, these details are not intended to limit the scope of the invention as claimed in the appended claims.

What is claimed is:

1. A network system for implementing network device identification via a connected Ethernet cable comprising:
   a server having a port connected by an Ethernet cable, said Ethernet cable connected to a port of a switch;
   a processor;
   an Ethernet runt packet transmit control tangibly embodied in a non-transitory machine readable medium used in implementing network device identification by use of the processor;
   wherein the processor is configured for:
   transmitting, by said processor using said Ethernet runt packet transmit control, a first Ethernet runt packet containing metadata identifying the server name and the port on the cable by the server to the switch;
   transmitting a second Ethernet runt packet containing metadata identifying the switch name and the port on the cable by the switch to the server, wherein said processor transmitting the first ethernet runt packet and the second ethernet runt packet comprises:
   transmitting intentional ethernet runt packets including 63 byes of less bytes of coded information to determine where the ethernet cable is physically connected; and
   dynamically identifying and labeling the Ethernet cable, the connected server and port, and the connected switch and port using the transmitted metadata of the first Ethernet runt packet and the second ethernet runt packet.

2. The network system as recited in claim 1, further comprising a visual interface display to visually access the metadata for a particular port.

3. The network system as recited in claim 1, wherein said processor dynamically detects and digitally identifies the cable.

4. The network system as recited in claim 1, further comprising an intelligent patch panel and wherein said processor dynamically detects and digitally identifies a particular port of at least one of the switch, server, and said intelligent patch panel.

5. The network system as recited in claim 4, wherein said intelligent patch panel reads the runt packets without discarding the runt packets, and displays a connected input and output of a particular port.

6. The network system as recited in claim 1, further comprising a pass through device coupled to the cable for displaying the runt packet metadata passing through the pass through device in either direction.

7. The network system as recited in claim 1, wherein said runt packets existing for a single hop on the network system, and are discarded without being repeated.

8. The network system as recited in claim 1, wherein dynamically identifying and labeling the ethernet cable is based on all of the 63 bytes or less bytes of coded information.

9. The network system as recited in claim 1, further comprising a visual interface display enabling visual access to detected metadata.

10. The network system as recited in claim 9, wherein said visual interface display enables visual access to detected metadata at the server.

11. The network system as recited in claim 10, wherein said visual interface display enables visual access to detected metadata at the switch.

12. A method for implementing network device identification via a connected Ethernet cable in a network system, the network system including a server having a port connected by an Ethernet cable, the Ethernet cable connected to a port of a switch, and an Ethernet runt packet transmit control tangibly embodied in a non-transitory machine readable medium used in implementing network device identification by use of a processor, said method comprising:
   transmitting a first Ethernet runt packet containing metadata identifying the server name and the port on the cable by the server to the switch;
   transmitting a second Ethernet runt packet containing metadata identifying the switch name and the port on the cable by the switch to the server, wherein said processor transmitting the first ethernet runt packet and the second ethernet runt packet comprises:
      transmitting intentional ethernet runt packets including 63 byes of less bytes of coded information to determine where the ethernet cable is physically connected; and
   dynamically identifying the connected Ethernet cable using the transmitted metadata of the first Ethernet runt packet and the second ethernet runt packet.

13. The method as recited in claim 12, wherein using the transmitted metadata of the Ethernet runt packets for dynamically identifying the connected Ethernet cable comprises dynamically identifying the connected server and port, and the connected switch and port.

14. The method as recited in claim 12, wherein using the transmitted metadata of the Ethernet runt packets for dynamically identifying the connected Ethernet cable is performed by the server.

15. The method as recited in claim 12, wherein using the transmitted metadata of the Ethernet runt packets for dynamically identifying the connected Ethernet cable is performed by the switch.

16. The method as recited in claim 12, wherein using the transmitted metadata of the Ethernet runt packets for dynamically identifying the connected Ethernet cable is performed by an intelligent patch panel coupled to the Ethernet cable.

17. The method as recited in claim 12, wherein the step of transmitting the first Ethernet runt packets by the server and the step of transmitting the second Ethernet runt packet by the switch are done on a repeating basis.

18. The method as recited in claim 12, wherein using the transmitted metadata of the Ethernet runt packets for dynamically identifying the connected Ethernet cable comprises providing an intelligent network device capability with the server and the switch to dynamically identify connected cables based on interpreting Ethernet runt packets using intelligent metadata transmitted on a specific cable.

19. The method as recited in claim 12, further comprising displaying the runt packet metadata passing, in either direction, through a pass through device coupled to the Ethernet cable.

20. The method as recited in claim 19, wherein said pass through device reads the runt packets without modifying or discarding the runt packets.

\* \* \* \* \*